United States Patent [19]
Vergnes et al.

[11] Patent Number: 5,703,915
[45] Date of Patent: Dec. 30, 1997

[54] TRANSMISSION SYSTEM AND MULTIPLEXING/DEMULTIPLEXING EQUIPMENT INVOLVING A JUSTIFIABLE BIT STREAM

[75] Inventors: Alain Vergnes, Corbeil Essonnes; Patrick Albert, Maisons Alfort, both of France

[73] Assignee: Lucent Technologies Inc., Murray Hill, N.J.

[21] Appl. No.: 526,018

[22] Filed: Sep. 8, 1995

[30] Foreign Application Priority Data

Sep. 13, 1994 [FR] France .................... 94 10909

[51] Int. Cl.$^6$ .................... H04J 3/06; H04L 7/04
[52] U.S. Cl. .................... 375/371; 370/505
[58] Field of Search .................... 370/84, 102, 503, 370/505, 506, 516; 375/363, 371, 372, 247, 248, 249, 250, 251, 375

[56] References Cited

U.S. PATENT DOCUMENTS

| | | | |
|---|---|---|---|
| 5,027,120 | 6/1991 | Thurston | 375/247 |
| 5,325,399 | 6/1994 | Haspeslagh et al. | 375/247 |
| 5,469,475 | 11/1995 | Voorman | 375/247 |
| 5,493,589 | 2/1996 | Ibenthal | 375/372 |
| 5,504,752 | 4/1996 | Okazaki | 370/102 |
| 5,537,447 | 7/1996 | Urbansky | 375/372 |

FOREIGN PATENT DOCUMENTS

| | | | |
|---|---|---|---|
| 2064602 | 10/1992 | Canada | H04L 1/00 |
| 0461703A2 | 12/1991 | European Pat. Off. | H04L 25/36 |

*Primary Examiner*—Wellington Chin
*Assistant Examiner*—Soon-Dong Hyun
*Attorney, Agent, or Firm*—Jimmy Goo

[57] ABSTRACT

For this system and for this equipment there has been provided a phase alignment device (30) which has an access for input data (50) applied to an access (51) at a rate of a first clock signal, and an access (70) for producing at the rate of a second clock signal applied to an access (71) a justifiable data stream, in which stream bits can be inserted or deleted. The data are written and read in and from a common memory (60) by means of a write counter (55) and a read counter (80), respectively. A comparing element (90) measures the difference of the contents of said counters (55) and (80). With each variation of this difference, intermediate steps are added with the elements (95), (97) and (98), so that the means (92) controlling the justification can be formed by a sigma-delta modulator which has a 0.5 threshold.

6 Claims, 8 Drawing Sheets

TRANSMISSION SYSTEM AND MULTIPLEXING/DEMULTIPLEXING EQUIPMENT INVOLVING A JUSTIFIABLE BIT STREAM

FIELD OF THE INVENTION

The present invention relates to a transmission system which involves data transmitted with a first timing and a justifiable bit stream transmitted with a second timing, which system has

- an access for input data formed by bits produced at the first clock rate,
- an access for producing at the second clock rate said stream in which bits can be inserted or deleted,
- a buffer memory,
- write means for writing at a write location of the buffer memory the data coming from said access for data coming in at the first rate,
- reading means for reading from a read location of the buffer memory the data stored at the second rate and for forming said stream,
- location comparing means for producing a comparison code of the read location codes with the write location codes,
- justification means for inserting and/or deleting bits in the outgoing data stream as a function of the comparison code.

The invention likewise relates to pieces of multiplexing and demultiplexing equipment which imply a bit stream that can be justified.

Such a system finds important applications in the field of data transmission, especially when used in digital networks known under the name of Synchronous Digital Hierarchy (SDH) networks and described in Recommendations UIT-T G.707, G.708, G.709 and others.

BACKGROUND OF THE INVENTION

A system of this type is described in Canadian Patent Application no. 2 064 602.

In such systems one is confronting the problem caused by the frequency difference between the oscillators that determine the first and second clock rates. For adapting these rates there is provided a phase alignment device. However, despite the presence of this device there may still remain slow phase offsets which causes a frequency jitter called wander to arise. This leads to distortion which may be tolerable under certain circumstances, but which may disturb the user circuit under different circumstances.

SUMMARY OF THE INVENTION

To solve this problem, the invention proposes a system of the type defined in the opening paragraph, characterized in that the comparing means have:

- an interpolation element for producing intermediate values between variations of the comparison code, and in that the justification means have:

- a decision circuit which has a decision threshold provided for controlling a justification and whose value may be one of the intermediate values.

These and other aspects of the invention will be apparent from and elucidated with reference to the embodiments described hereinafter.

DESCRIPTION OF PREFERRED EMBODIMENTS

Figure 1:
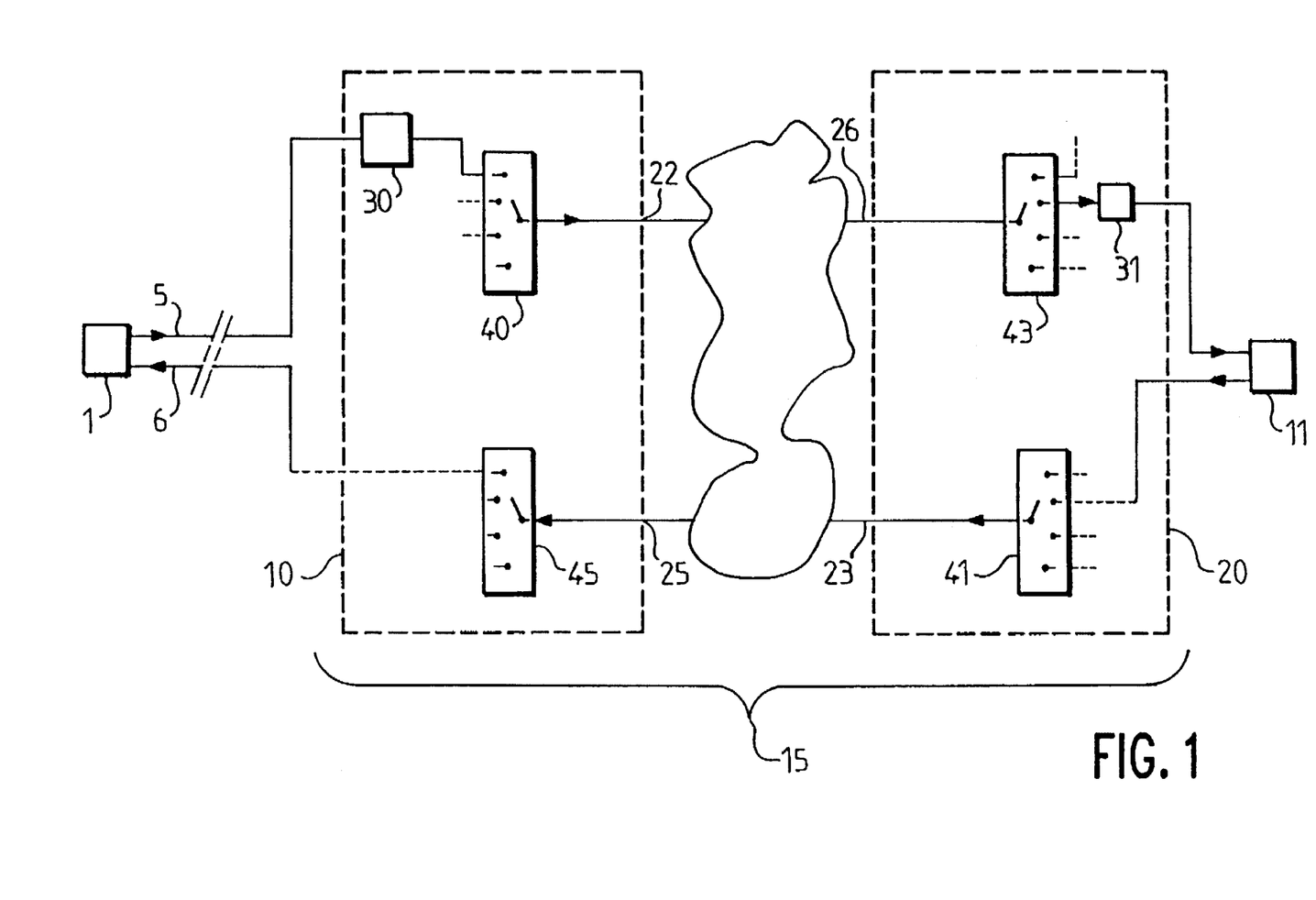
FIG. 1 shows a system according to the invention.

In FIG. 1 reference 1 indicates a data terminal which transmits and receives data at 2048 kbit/s over respective transmission lines 5 and 6. These lines are connected to multiplexer/demultiplexer equipment 10 for the network 15 designed for a system known by the name of Synchronous Digital Hierarchy, or SDH for short. This terminal 1 can be brought into communication with another terminal 11 which is connected to this network via other multiplexing/demultiplexing equipment 20. The terminals 1 and 11 work at a clock rate of 2.048 MHz with an accuracy of ±50 ppm. The pieces of multiplexing/demultiplexing equipment 10 and 20 produce on their outputs 22 and 23 a 155 Mbit/s multiplex for 63 terminals of 2.048 Mbit/s and receive a similar multiplex on their inputs 25 and 26. To simplify the explanation, the elements of multiplexing/demultiplexing equipment 10 and 20 are diagrammatically shown, in essence, in the form of multiplexers 40 and 41 for the pieces of equipment 10 and 20 and demultiplexers 43 and 45 respectively, for the pieces of equipment 10 and 20.

Said SDH network operates with a certain frequency which may differ by a value of ±20 ppm from that of the data terminals 1 and 11 which, furthermore, operate with independent clocks. To ensure this synchronization, equipment 10 has been designed to include a phase alignment or phase synchronizing circuit 30, so that the data received from terminal 1 are coherent with the frequency of the network and, with respect to the equipment 20, to include a desynchronizing circuit 31, so that the supplied data are coherent with those of terminal 11 which receives them.

Figure 2:
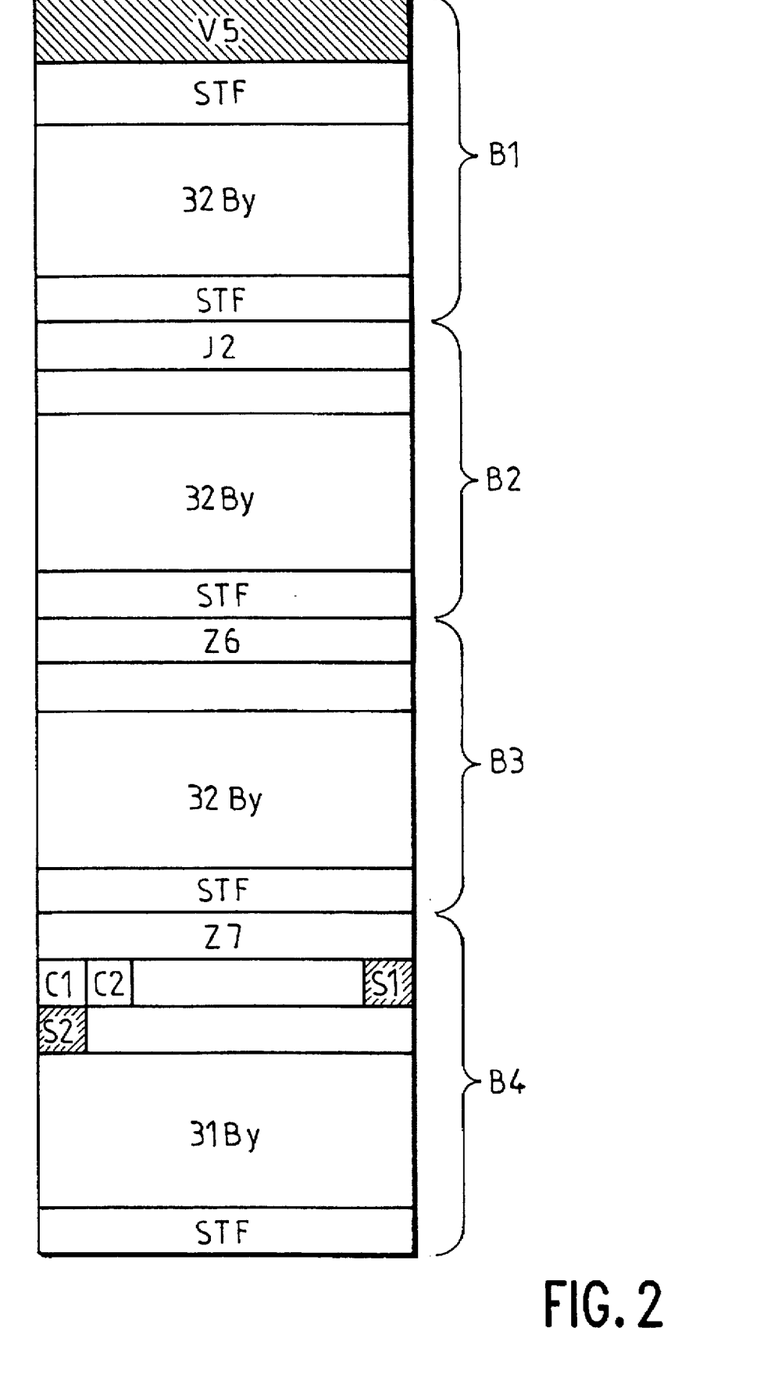
FIG. 2 shows the organisation of the data locations of a virtual container VC12.

The embodiment is more particularly suitable for transporting 2.048 Mbit/s in a virtual container VC12 via a tributary unit TU12. FIG. 2 shows the organisation of the data in this virtual container VC12, while FIG. 3 shows an example of a position of the tributary unit TU12 in a multiframe STM1.

The tributary unit TU12 is formed by 144 octets, which leads to 140 octets for the virtual container VC12 which is divided into four blocks B1, B2, B3 and B4 of 35 octets each. There will be noted that the first three blocks contain each 32 octets for the payload and the fourth block contains 32 octets ±1 bit. These octets are used for transporting the payload bits coming from data coming in via access 50. The variation by ±1 bit of which the control is determined by the bits C1 and C2, is employed on the locations S1 and S2 indicated in FIG. 2 and forms that which is called justification.

Figure 3:
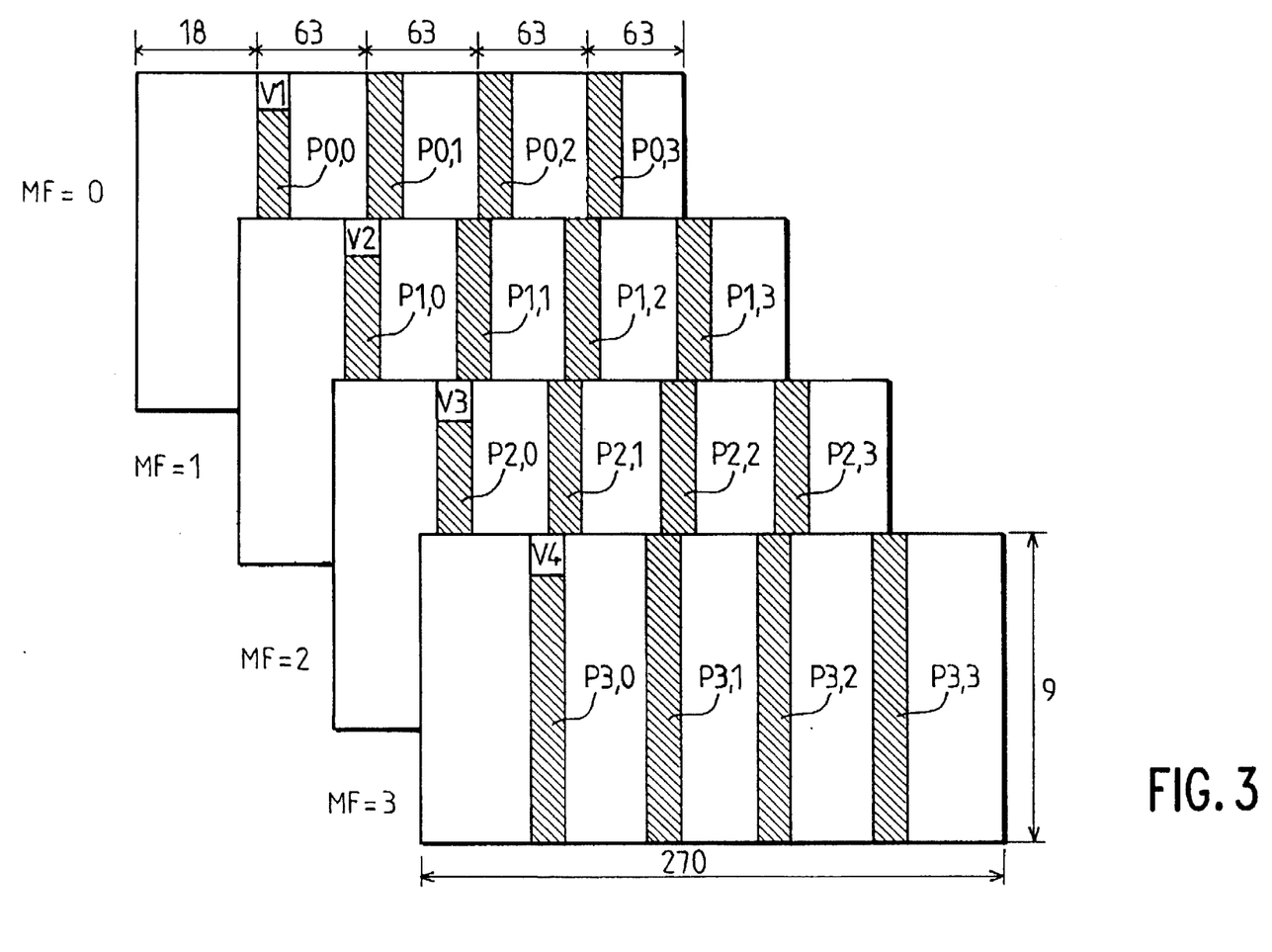
FIG. 3 shows the locations of the tributary unit TU12 in a multiframe STM1.

The multiframe STM1 shown in FIG. 3 is formed by four frames MF=0, MF=1, MF=2, and MF=3. Each of these frames is formed by 2430 octets arranged in a rectangle of 270×9 octets. The hatched portions:

P0,0 P0,1 P0,2 P0,3 of the frame MF=0
P1,0 P1,1 P1,2 P1,3 of the frame MF=1
P2,0 P2,1 P2,2 P2,3 of the frame MF=2
P3,0 P3,1 P3,2 P3,3 of the frame MF=3 contain the octets of the virtual container shown in FIG. 2. The multiframe shown in this FIG. 3 is transmitted in series starting with frame MF=0, by reading same from left to right and top to bottom. The hatched part P0,1 is 18 octets away from the edge and the hatched parts P0,1 P0,2 P0,3 are 63 octets apart. 128 octets are transmitted in 500 μs (when considering S2 a data bit without performing a justification), which corresponds to a 2.048 Mbit/s rate.

Figure 4:
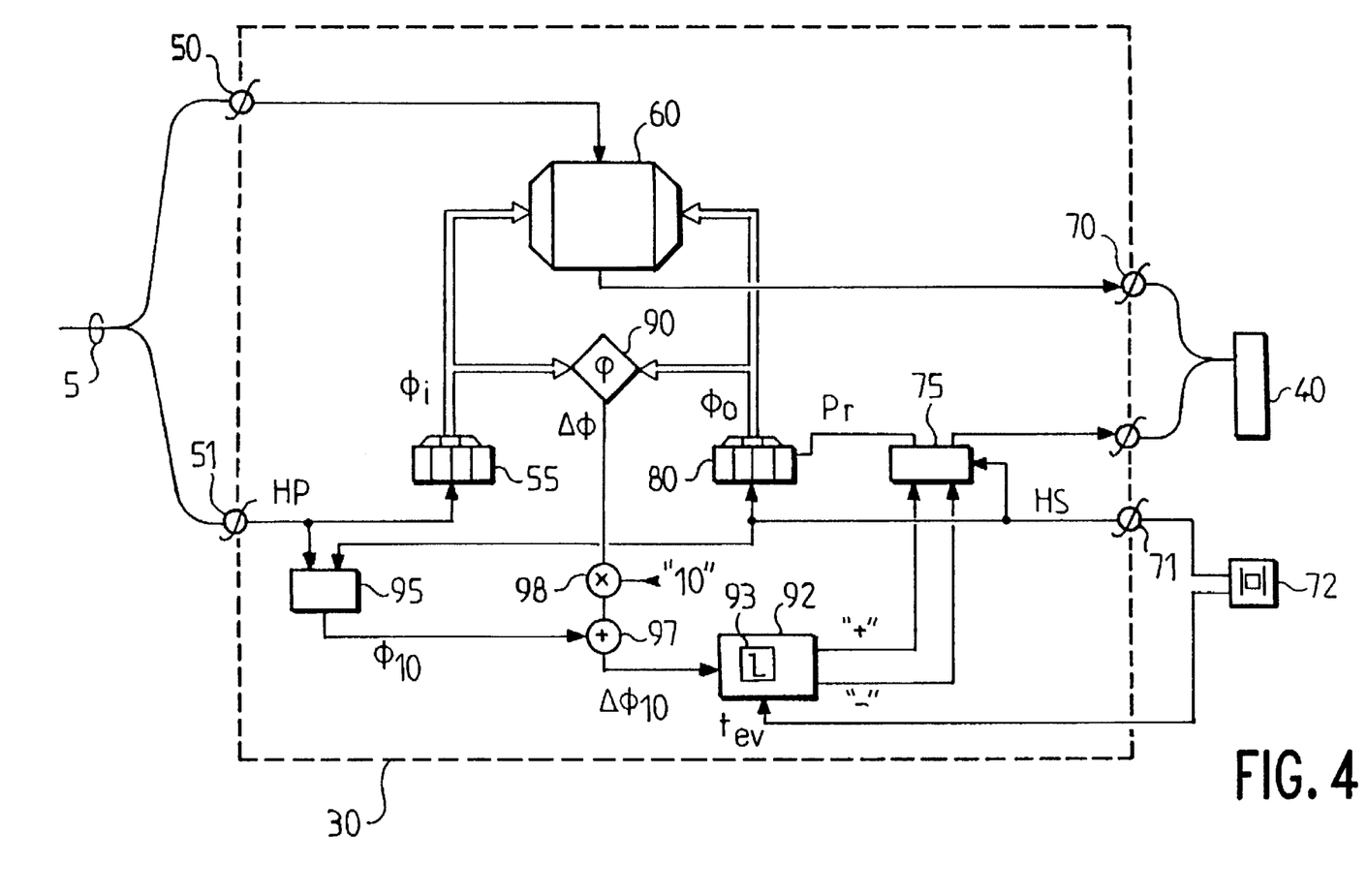
FIG. 4 shows a phase alignment circuit which forms part of the system according to the invention.

FIG. 4 shows the embodying diagram of the phase alignment circuit 30. In the SDH technique one could find embodiments for other circuits (see, for example, Application for Canadian Patent no. 2 064 602 mentioned above). In this FIG. 4, the terminal 50 receives the data from line 5 and terminal 51 the clock signals HP, called plesiochronous clock signals, which are associated to the data and whose frequency is 2.048 MHz. These clock signals feed, in essence, a write counter 55 for a buffer memory 60. The data read from this buffer memory are recovered at the data terminal 70 in timing with the read clock signal HS applied to a terminal 71 whose frequency is 19.44 MHz which corresponds to the frequency of the octets carried in the multiframe STM1. This terminal 71 is connected to the output of a clock 72 which forms part of the SDH system. An SDH frame management element referenced 75 supplies, on the one hand, the signals or service bytes according to FIG. 2 to the multiplexer 40 and, on the other hand, supplies a tapping signal Pt, so that the data are tapped from this memory according to their place in the multiframe STM1. The signal Pr of the element 75 authorizes the incrementation of a read counter 80 of memory 60. This counter 80 thus counts the pulses of the clock signal HS which are available on terminal 71 when the signal Pr authorizes this counter to do so. On average, the counting frequency will obviously be that of the incoming tributary unit: 2.048 MHz±50 ppm. A phase comparing element 90 continuously analyses the contents Φi and Φo of the counters 55 and 80. The result of this comparison ΔΦ is given by the formula:

$$\Delta\Phi = \{(\Phi i - \Phi o + M)_{MoaM} - (M/2)\}$$

where M is the total bit capacity of the memory 60. There will be found that ΔΦ=0 for $(\Phi i - \Phi o + M)_{MODM} = M/2$. It will then be guaranteed that the read addresses and write addresses are sufficiently wide apart to avoid a simultaneous writing and reading operation at the same location of memory 60.

On the basis of this result, a justification control circuit 92 determines whether a justification is possibly to be made. The justification command is sent to the management dement 75. The justification control circuit 92 processes the result of the comparison circuit 90 via a threshold circuit 93 and the moment when the latter indicates too large a difference between the contents of the two counters 55 and 80, a justification is started. For example, either a bit is added to the data stream, the bit S1 thus forms part of the payload data to be transmitted, or a bit is deleted, the bits S1 and S2 thus do not form part of the payload data to be transmitted.

Figure 5:
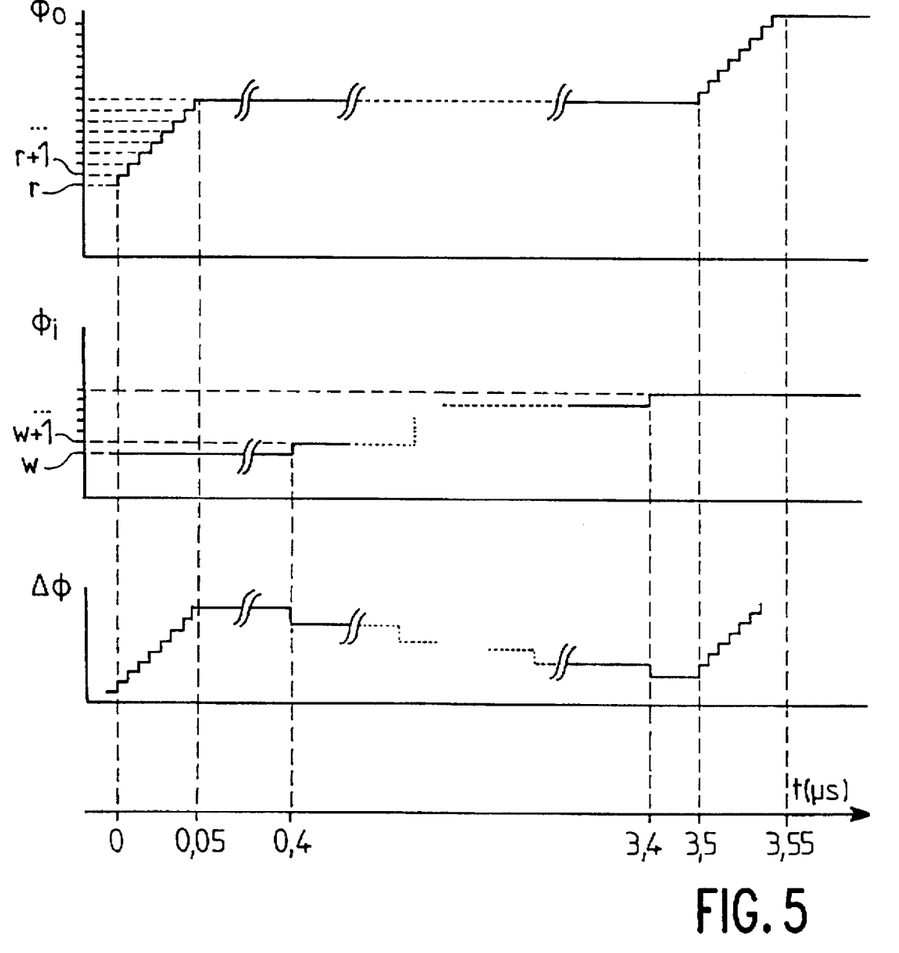
FIG. 5 shows plotted against time, the variations and the difference of the counts of counters which form part of the circuit of the previous Figure.

FIG. 5 shows how the contents Φi and Φo of the counters 55 and 80 as well as their differences are developed. The contents Φo of the counter 80 develop as a function of the multiframe STM1 used. Thus between times arbitrarily called 0–0.05 μs, the contents Φo augment by 8 units and between the times 0.05–3.5 μs the contents do not change. Then, between the times 3.5–3.55 μs, again these contents change by 8 unit steps. The contents Φi of the counter 55 change in a uniform manner by one unit step every 0.5 μs or, more accurately, 0.488 μs (=1/2.048 MHz), that is, at the instants 0.4 . . . 3.4 μs. The variations of the difference ΔΦ of these contents can be derived from that which has just been observed. After an augmentation by eight unit steps, this difference diminishes by one unit step every 0.488 μs.

Figure 6:
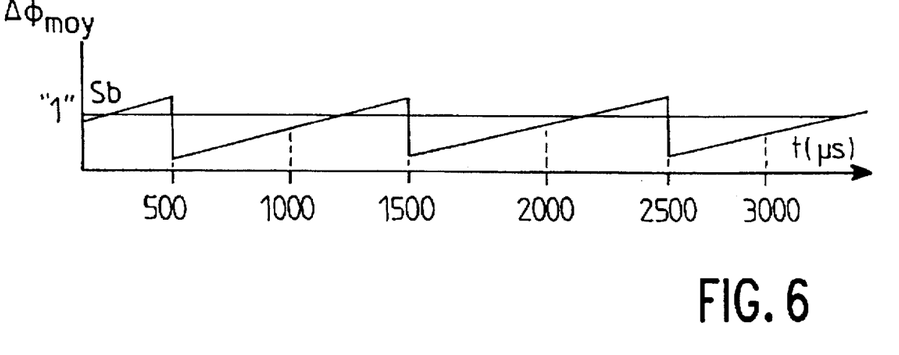
FIG. 6 shows the development of said difference of the contents of the counters.

The error of this difference is analyzed every 500 μs exactly at intervals $T_{ev}$ fixed by the clock 72 (see FIG. 6). However, it is this duration of exactly 500 μs that the number of bits written in the memory 60 are to correspond to the number of bits read therefrom. If there is a frequency drift between the tapping of the bits from the buffer memory 60 and their being written, the difference $\Delta\Phi_{moy}$, considered the mean value of ΔΦ, is to grow until instant $t_{ev}$ if the difference $\Delta\Phi_{moy}$ is higher than the justification capacity of the tributary unit, one justification is thus called for and will diminish this difference by one unit step. Then, this mean value starts growing again. This error fluctuates with time, more particularly, as a function of said frequency drifts and leads to the appearance of low-frequency components in its spectrum. These components are hard to process at the receiving end.

According to the invention, for largely suppressing or deleting these low-frequency components by the phase control of the desynchronization circuit 31, the system according to the invention utilizes a sigma-delta modulator as a justification circuit 92. Such a modulator needs to have a threshold of 0.5. Therefore, the system comprises an interpolation element 95 (cf. FIG. 4) to define intermediate steps $\Phi_{10}$ for each variation of the comparison code. Within the framework of the described example, there are proposed ten intermediate steps, so that a one-bit error is evaluated by ten of these intermediate steps. Thus, the threshold value may become equal to 0.5. These intermediate steps are applied to an adder 97 which adds these steps together with the variations ΔΦ previously multiplied by 10 by a multiplier 98, so that the threshold becomes in fact Sb=5.

Figure 7:
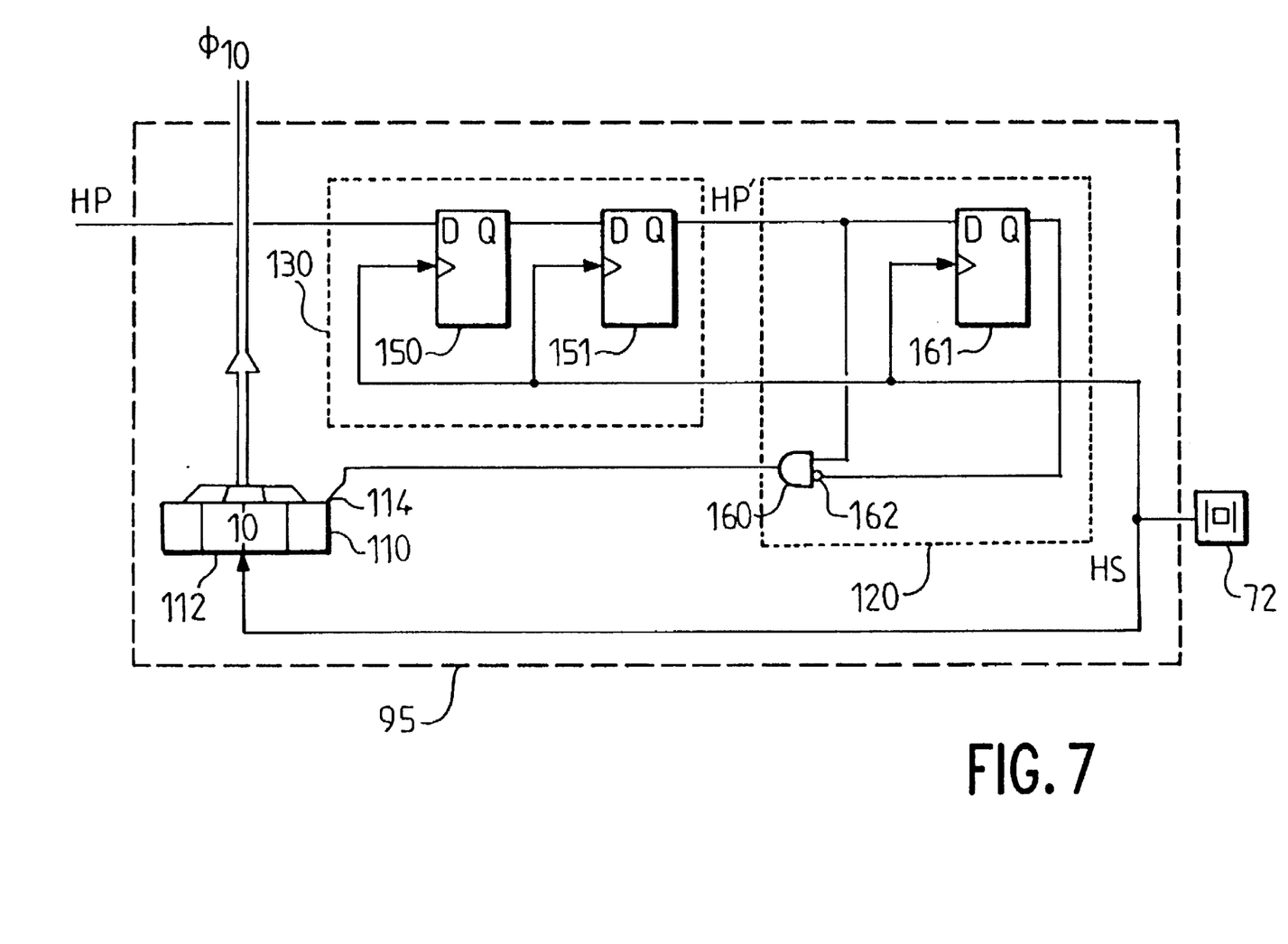
FIG. 7 shows a diagram of the extrapolation element.

This interpolation circuit 95 is shown in more detail in FIG. 7. It is formed, in essence, by a modulo-10 counter 110. This counter has a count input 112 for counting the HS clock signals 72 at 19.44 MHz which is very close to being equal to ten times the value of HP of 2.048 MHz and which has the advantage of being supplied by the system clock 72. This counter 110 also has a reset to zero input 114 to be reset to zero in response to the indication of each rising edge of the clock signal HP. This edge is detected by a rising edge detecting circuit 120 preceded by a phase alignment circuit 130 which aligns with time the value changes of the signal HP with the signal HS. This aligned signal HP is referenced HP'. The circuit 130 is formed by two D-flip-flops 150 and 151 connected in a cascaded combination. The D-input of flip-flop 150 receives the signal HP and the Q-output of the flip-flop 151 produces the value of HP aligned with the signal HS which is applied to the clock inputs of these flip-flops 150 and 151. This cascaded combination avoids the parasitic phenomena (metastability) which suddenly appear when values at the D-inputs and clock inputs of the flip-flops change simultaneously.

For detecting the rising edges, there is an AND gate referenced 160 available at the input and output of another flip-flop 161 connected in a cascaded combination with the tip-flop 151. The AND gate has an inverting input 162, so that this AND gate produces an active logic "1" signal when before an active edge of the signal HS the value of the signal HP' is zero, and afterwards the value is "1". This is expressed in the appearance of a rising edge HP. The value of the intermediate steps $\Phi_{10}$ is produced by the parallel outputs of the counter 110.

Figure 8:
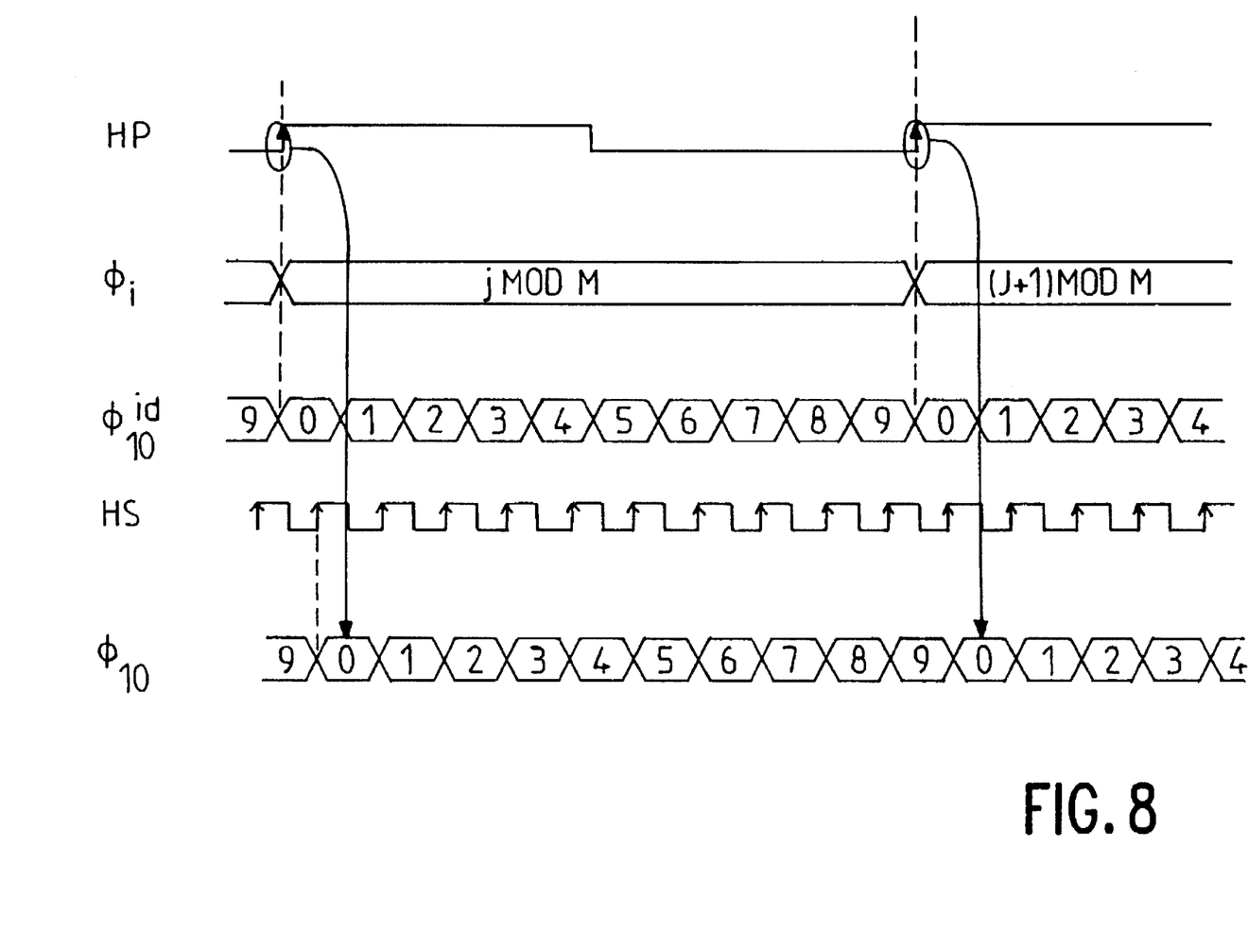
FIG. 8 is a time diagram intended for the explanation of the operation of the system shown in FIG. 4.

FIG. 8 shows a timing diagram of the operation of circuit 30. The signals HP, $\Phi_i$, HS and $\Phi_{10}$ have already been mentioned. In this drawing Figure there will be noted that the quantity $\Phi_i$ changes its value upon the rising edges of the signal HP. According to the invention, there is proposed to subdivide into ten equal parts the time interval which separates the change of value from this quantity $\Phi_i$. This is shown by the line $\Phi_{10}{}^{id}$ which represents this subdivision in an ideal manner. According to an aspect of the invention, for making this subdivision one profits by the frequency ratio $f_{HS}$ to $f_{HP}$ of the respective signals HS and HP. In effect, this ratio is:

Albeit this subdivision effected by the signal HS (line $\Phi_{10}$) is only an approximation, it is $$\frac{f_{HS}}{f_{HP}} = \frac{19.44}{2.048} = 9.49 \cong 10$$

sufficient for the application under consideration.

Figure 9:
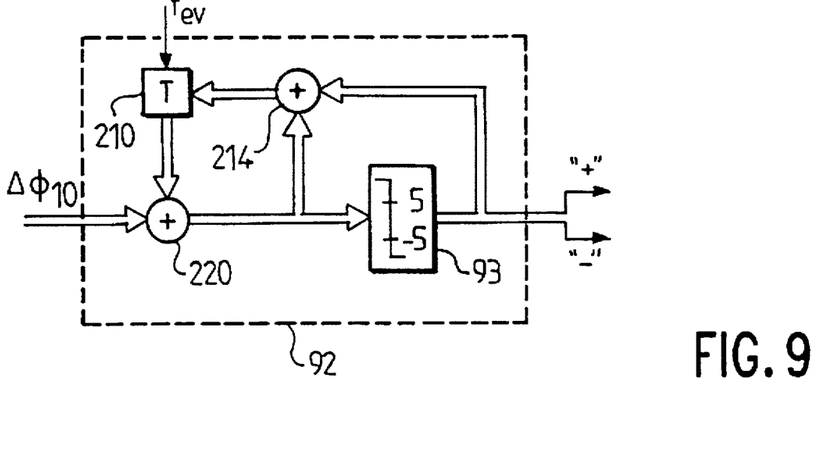
FIG. 9 shows the diagram of a justification control element.

FIG. 9 diagrammatically shows in detail the justification control circuit 92 while the measures according to the invention are taken into account. This circuit evaluates at instants $t_{ev}$ every 500 µs the values $\Delta\Phi_{10}$. A memory circuit 210 enabled by the signals $t_{ev}$, stores the output signals of an adder 214 whose two inputs are connected respectively, to the input and output of the threshold circuit 93. The input of the threshold circuit is connected to the output of an adder circuit 220. From the output wires of the threshold circuit are derived two wires which transmit the signals that represent the threshold function. A first wire "+", when it transmits an active signal, indicates that the positive threshold (+5) is exceeded and thus that a negative justification is to be triggered, and the second wire "−" relating to a positive justification indicates that the error signal lies below the negative threshold (−5) and thus that a positive justification is to be triggered. This circuit 92 inserts a filter function which attenuates the DC-component noise by centring the remaining noise, near the sampling frequency caused by the signal $t_{ev}$. This circuit thus forms said sigma-delta modulator.

Figure 10:
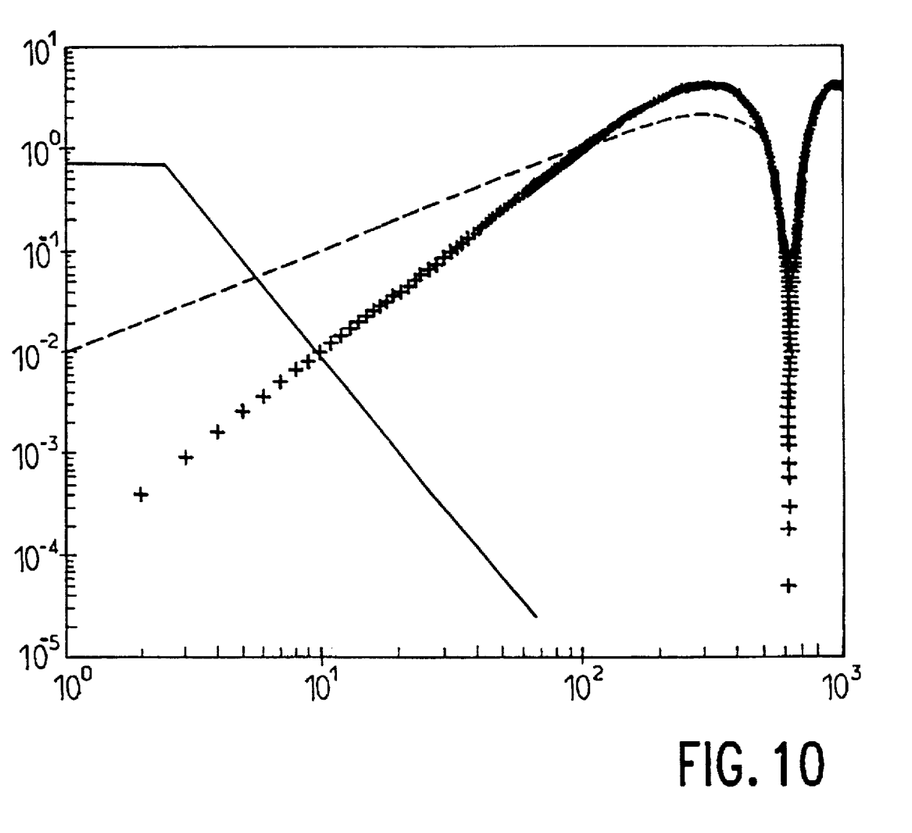
FIG. 10 shows the frequency characteristics of the various transfer functions.

FIG. 10 clearly shows the advantages provided by the invention. This Figure represents in a broken line curve the transfer characteristic for which no measure previously known by the invention is applied. Worded differently, the difference between the contents of the counters $\Delta\Phi$ is applied directly to the threshold element. The transfer characteristic represented in small crosses relates to the invention. The low-pass characteristic of a phase control device allocated to a user is represented in a solid line. It will be observed that on the side of the low frequencies the measures provided by the invention result in a considerable reduction, especially in the field of said low-pass characteristic.

We claim:

1. Transmission system which involves data transmitted at a first rate and a justifiable bit stream transmitted at a second rate, which system has an access for input data formed by bits produced at a first clock rate, an access for producing at the second clock rate said stream in which bits can be inserted or deleted, a buffer memory, write means for writing at a write location of the buffer memory the data coming from said access for data coming in at the first rate, reading means for reading from a read location of the buffer memory the data stored at the second rate and for forming said stream, location comparing means for producing a comparison code of the read location codes with the write location codes, justification means for inserting and/or deleting bits in the outgoing data stream as a function of the comparison code, characterized in that the comparing means have:

an interpolation element for producing intermediate values between variations of the comparison code, and in that the justification means have:

a decision circuit which has a decision threshold provided for controlling a justification and whose value may be one of the intermediate values.

2. Transmission system as claimed in claim 1, characterized in that the justification means are formed by a circuit known by the name of sigma-delta modulator.

3. Multiplexing/demultiplexing equipment involving data transmitted with a first timing and a justifiable bit stream transmitted with a second timing, which equipment comprises at least a phase alignment device which has:

an access for input data formed by bits produced at a first clock rate, an access for producing at the second clock rate said stream in which bits can be inserted or deleted, a buffer memory write means for writing at a write location of the buffer memory the data coming from said access for data coming in at the first rate, reading means for reading from a read location of the buffer memory the data stored at the second rate and for forming said stream, location comparing means for producing a comparison code of the read location codes with the write location codes, justification means for inserting and/or deleting bits in the outgoing data stream as a function of the comparison code, characterized in that the comparing means have:

an interpolation element for producing intermediate values between variations of the comparison code, and in that the justification means have:

a decision circuit which has a decision threshold provided for controlling a justification and whose value may be one of the intermediate values.

4. Multiplexing/demultiplexing equipment as claimed in claim 3, characterized in that the justification means are formed by a circuit known by the name of sigma-delta modulator.

5. Phase alignment device which has:

an access for input data formed by bits produced at a first clock rate, an access for producing at a second clock rate a justifiable bit stream in which bits can be inserted or deleted, a buffer memory write means for writing at a write location of the buffer memory the data coming from said access for data coming in at the first rate, reading means for reading from a read location of the buffer memory the data stored at the second rate and for forming said stream, location comparing means for producing a comparison code of the read location codes with the write location codes, justification means for inserting and/or deleting bits in the outgoing data stream as a function of the comparison code, characterized in that the comparing means have:

an interpolation element for producing intermediate values between variations of the comparison code, and in that the justification means comprise:

a decision circuit which has a decision threshold provided for controlling a justification and whose value may be one of the intermediate values.

6. Phase alignment device as claimed in claim 5, characterized in that the justification means are formed based upon a circuit known by the name of sigma-delta modulator.

* * * * *